(12) United States Patent
Greenwald et al.

(10) Patent No.: US 11,295,154 B2
(45) Date of Patent: Apr. 5, 2022

(54) PHYSICAL ITEM OPTIMIZATION USING VELOCITY FACTORS

(71) Applicant: Etsy, Inc., Brooklyn, NY (US)

(72) Inventors: Daniel Greenwald, San Francisco, CA (US); Dan Oron, Sunnyvale, CA (US); Maxwell Tang, New York, NY (US); Tim Chu, New York, NY (US)

(73) Assignee: Etsy, Inc., Brooklyn, NY (US)

( * ) Notice: Subject to any disclaimer, the term of this patent is extended or adjusted under 35 U.S.C. 154(b) by 30 days.

(21) Appl. No.: 16/267,116

(22) Filed: Feb. 4, 2019

(65) Prior Publication Data

US 2020/0250455 A1 Aug. 6, 2020

(51) Int. Cl.
*G06K 9/32* (2006.01)
*G06Q 30/06* (2012.01)
*G06N 3/08* (2006.01)
*G06T 7/60* (2017.01)
*G06N 20/00* (2019.01)
*G06Q 30/02* (2012.01)

(52) U.S. Cl.
CPC .............. *G06K 9/3241* (2013.01); *G06N 3/08* (2013.01); *G06N 20/00* (2019.01); *G06Q 30/0206* (2013.01); *G06Q 30/0643* (2013.01); *G06T 7/60* (2013.01)

(58) Field of Classification Search
CPC ...... G06N 20/00; G06N 3/08; G06Q 30/0206; G06Q 30/0643; G06T 7/60
See application file for complete search history.

(56) References Cited

U.S. PATENT DOCUMENTS

| | | | |
|---|---|---|---|
| 8,175,932 B2 | 5/2012 | Zellner et al. | |
| 8,489,515 B2* | 7/2013 | Mathur | H04L 51/32 |
| | | | 705/319 |
| 9,043,302 B1* | 5/2015 | Shimshoni | G06F 16/951 |
| | | | 707/706 |
| 10,838,985 B2* | 11/2020 | Yao | G06F 16/2228 |
| 2001/0014868 A1* | 8/2001 | Herz | G06Q 30/02 |
| | | | 705/14.38 |

(Continued)

FOREIGN PATENT DOCUMENTS

| | | | | |
|---|---|---|---|---|
| EP | 2216746 A1 * | 8/2010 | ............. | G06Q 30/02 |
| WO | WO-2021141744 A1 * | 7/2021 | ............. | G16H 10/60 |

*Primary Examiner* — Charles T Shedrick
(74) *Attorney, Agent, or Firm* — Fish & Richardson P.C.

(57) ABSTRACT

Methods, systems, and computer readable medium for optimizing physical products. The method includes detecting a set of physical attributes for each physical item among multiple different physical items, obtaining a velocity factor for each of the physical items, generating a mapping of a velocity contribution to various combinations of physical attributes among the set of physical attributes based on the velocity factor for each physical item and the set of physical attributes of that physical item, determining, based on the mapping, that the velocity factor of a particular physical item will increase in response to a change to one or more physical attributes of the particular physical item, and transmitting, to a source of the particular item, an electronic message that conveys the increase to the velocity factor of the particular physical item that will result from a selection of the one or more physical attributes of the particular item.

15 Claims, 7 Drawing Sheets

(56) References Cited

U.S. PATENT DOCUMENTS

| | | | |
|---|---|---|---|
| 2003/0088457 A1* | 5/2003 | Keil | G06Q 30/0203 |
| | | | 705/7.32 |
| 2011/0302117 A1* | 12/2011 | Pinckney | G06F 16/9535 |
| | | | 706/12 |
| 2014/0172543 A1* | 6/2014 | Eyal | G06Q 30/0242 |
| | | | 705/14.43 |
| 2014/0195328 A1* | 7/2014 | Ferens | G06Q 30/0271 |
| | | | 705/14.41 |
| 2014/0280890 A1* | 9/2014 | Yi | H04L 67/22 |
| | | | 709/224 |
| 2015/0326680 A1* | 11/2015 | Farahani | G06Q 30/02 |
| | | | 706/12 |
| 2018/0053244 A1* | 2/2018 | Hendlin | G06Q 30/0621 |
| 2019/0220871 A1* | 7/2019 | Greenberger | G06F 7/08 |
| 2019/0370837 A1* | 12/2019 | Shamiss | G06N 20/00 |
| 2020/0005192 A1* | 1/2020 | Kumar | G06N 20/00 |
| 2020/0110810 A1* | 4/2020 | Brehm | H04N 21/454 |
| 2020/0118199 A1* | 4/2020 | Chaudhry | G06F 16/908 |
| 2020/0311796 A1* | 10/2020 | Tang | G06N 3/08 |

\* cited by examiner

PHYSICAL ITEM OPTIMIZATION USING VELOCITY FACTORS

BACKGROUND

This document relates to optimizing physical products.

Physical products can be produced with various different attributes. For example, physical products can vary in their shape, size, color, texture, or in other ways. The combination of attributes of a particular physical product can affect its usefulness, desirability, or functionality.

SUMMARY

In general, one innovative aspect of the subject matter described in this specification can be embodied in a method that includes detecting, by one or more data processing apparatus, a set of physical attributes for each physical item among multiple different physical items. The method includes obtaining a velocity factor for each of the multiple different physical items, generating a mapping of a velocity contribution to various combinations of physical attributes among the set of physical attributes based on the velocity factor for each physical item among the multiple different physical items and the set of physical attributes of that physical item, and determining, based on the mapping, that the velocity factor of a particular physical item will increase in response to a change to one or more physical attributes of the particular physical item. The method also includes transmitting, to a source of the particular item, an electronic message that conveys the increase to the velocity factor of the particular physical item that will result from a selection of the one or more physical attributes of the particular item.

Another embodiment of the subject matter described in this specification is a method that includes obtaining, for a member of a digital platform, state data specifying an objective state, analyzing, by one or more data processing apparatus, action data corresponding to actions taken by the member within the digital platform, outcome data specifying results of the actions taken within the digital platform, and environmental data specifying characteristics of the digital platform when each action was taken, creating, by the one or more data processing apparatus and based on the analysis of the action data, the outcome data, and the environmental data, an agent that determines sets of actions and corresponding probabilities of each set of actions achieving the objective state, and generating, by the one or more data processing apparatus, a visualization of one or more of the sets of actions that have a highest likelihood of achieving the objective state. The method also includes monitoring, by the agent, subsequent actions taken by the member after generation of the visualization and subsequent outcomes relative to the objective state and revising, by the agent, the sets of actions and corresponding probabilities based on the subsequent actions and the subsequent outcomes. The method includes changing a configuration for the member based on the revised set of actions and corresponding probabilities.

These and other embodiments can each optionally include one or more of the following features. Obtaining a velocity factor can include obtaining one or more of a change in searches over time, a change in acquisitions over time, a price. Generating a mapping of a velocity contribution to various combinations of physical attributes can include creating a machine learning model that applies reinforcement learning. Obtaining a velocity factor can include determination of a cyclical or periodic change in acquisitions over at least one of time or physical attributes. Transmitting an electronic message can include transmitting instructions that, when executed by the source of the particular item, cause a change to the one or more physical attributes of the particular item. Generating a mapping of a velocity contribution to various combinations of physical attributes can include analyzing a negative cost function. Detecting a set of physical attributes for each physical item among multiple different physical items can include performing image recognition.

Other embodiments of this aspect include corresponding systems, apparatus, and computer programs, configured to perform the actions of the methods, encoded on computer storage devices.

Particular embodiments of the subject matter described in this document can be implemented so as to realize one or more of the following advantages. The techniques discussed throughout this document can lead to production of more useful or desirable physical products, which can also be referred to as goods. The techniques discussed here facilitate the creation of new data that suggests changes to physical attributes of a product, e.g., changes to the size, shape, color, texture, or other physical features of the product. The suggestions can be based on customer feedback provided through a feedback loop of a digital platform, which accepts, through the feedback loop, information as to how well suited each particular product is to certain users, for certain tasks, and/or an overall level of satisfaction with the particular products. These techniques can be implemented using a system that monitors changes to velocity factors, each indicating user interest, such as changes in a popularity of an item, changes in price, changes in distribution volume, etc., to provide recommendations to a manufacturer of the product based on empirical consumer data.

The system conserves resources by guiding manufacturers to increase, reduce, or stop, production of physical items that have certain characteristics. By monitoring and predicting changes in the velocity factors for physical items, the system allows a manufacturer to produce the most efficient distribution of items, individual unit value, and increase the popularity of the manufacturer's physical products. The system applies machine learning to determine trends of interest in physical items with particular attributes, and can provide recommendations for changes to the physical attributes of the physical items that a manufacturer produces. This allows the manufacturer to adapt their production process to most efficiently meet consumer needs/desires for goods having specific physical attributes. In some situations, the system that implements the techniques discussed in this document can be in communication with a manufacturing facility or contact for the manufacturer and transmit a message that communicates the suggested changes, or other information, and/or initiate changes that cause the manufacturing facility to produce products having the suggested physical attributes, e.g., by modifying a state of manufacturing equipment.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
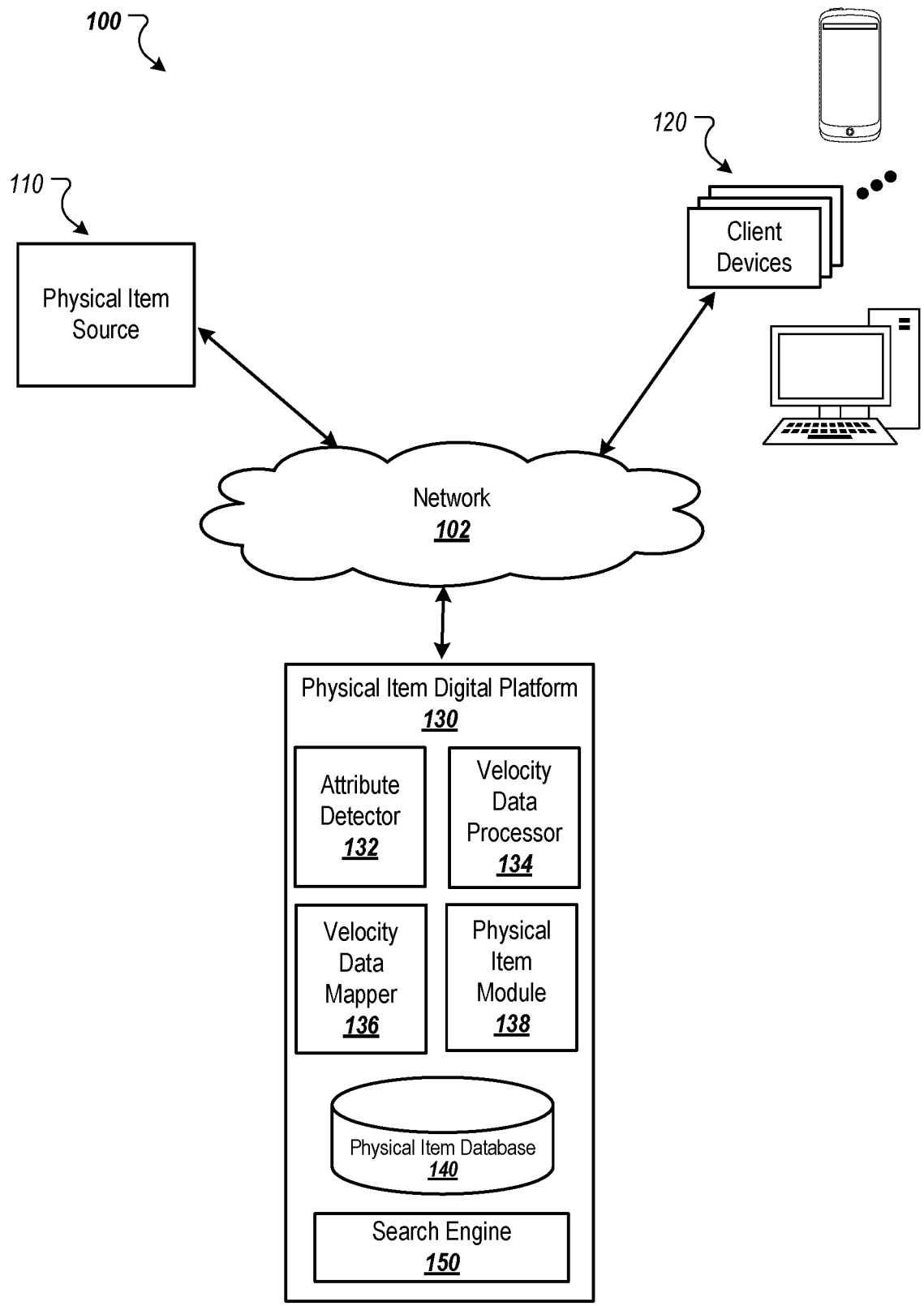
FIG. 1 is a block diagram of an example digital platform environment in which velocity factors for physical items can be monitored and analyzed.

This document describes methods, systems, and devices that provide insights into velocity factors of physical items. In some implementations, the items can be digital, such as a digital icon, a set of code, a digital download that can be printed (e.g., a photo design, a design that can be printed or manufactured using a 3-D printer, a water-jet, a router, etc.) that was designed or manufactured by a distributing member. As used throughout this document, a velocity factor is a measure of user interest in a physical attribute that is indicative of why certain physical items are sought out, obtained, and/or used more often by users of a digital platform and distribution properties of the physical products. Physical attributes of the physical items are analyzed in combination with information regarding distribution of the physical products over a digital platform (or over multi-channel distribution system), and a velocity factor for each physical attribute is generated. In some situations, each different physical attribute can be assigned a corresponding velocity factor, and a collection of velocity factors for multiple attributes of a given product can be represented in a velocity vector for that product. Changes to the physical attributes and combinations of physical attributes of a physical item can result in changes to velocity factors of the physical item, and the system can determine optimal combinations or changes for the items based on, for example, threshold amounts of changes to the velocity factors. For example, the system can automatically notify a member of a digital platform that a velocity factor for a given attribute or collection of attributes of a physical item has exceeded a threshold.

The system can provide, for example, a recommendation service for search tags within a digital platform that alerts a member of the digital platform that a velocity vector of a physical characteristic of the physical item has achieved a threshold aggregate or average velocity. For example, the system can alert a particular member that distributes mugs that searches for square-shaped mugs has increased by 50% over the previous seven days. Using this information, the system can provide rules-based test recommendations, and can verify its recommendations based on benchmarks.

In some implementations, the system can provide recommendation services across different types of distribution functionalities, such as search tags, completed transactions, item interactions, etc. The system can implement statistical testing through, for example, AB test recommendation services.

In some implementations, the system implements test recommendations generated based on machine learning models, such as Generative Adversarial Networks. The system implements various machine learning techniques, including auto-optimization through multi-armed bandit strategies, reinforcement learning, evolutionary strategies, etc.

The recommendation service can be integrated with the distribution stack of a particular digital platform, and can impact both interactions and completed transactions. In some implementations, the recommendation service can be integrated with, for example, a shop manager, accelerating the impact of the service on interactions and completed transactions.

The system can learn either object-type-specific or category-specific mappings between interaction information and the characteristics of physical items involved in the interactions. For example, the system can learn mappings between required amounts (e.g., prices) for physical items exchanged through use of a digital marketplace and the attributes of those physical items. The system then uses the information to identify a set of members that distribute of those types of items, analyze the attributes of the items being provided by that set of members, and provide recommendations as to changes that each member among the set could make to the physical attributes of their product in order to increase distribution of their items and/or amounts received for their items.

Digital platforms that provide access to physical items host distributor members ("d-members") that produce/distribute a wide variety of physical items. These items can differ in attributes such as style, color, composition, and other physical characteristics, and are often produced by the d-member. Many items are bespoke, and therefore can be modified by the d-member. To provide more information on what items to manufacture and how to manufacture them, the system develops machine learning models that inform the d-member of modifications to their physical items that will help them increase the number of acquiring members ("a-members") that seek out or obtain the physical items from the d-members. The system can train the models on activity or interaction data, such as the unit required amount for the items, the quantity sold, a projection of revenue, a projection of profit, longevity of sales, or any other metric observable from transaction data of the digital platform with sufficient instances to train a model. Such models may output a predicted improvement in a target metric if certain design modifications are made by the d-member. These models may be linear, for ease interpretability, or based on optimizing a nonlinear function based on the starting point (such as the original physical item provided by the d-member) subject to a distance constraint. In some implementations, the system can output real listings for physical products, output control commands that are used to change a state of manufacturing equipment to create physical items having the recommended physical attributes, or trigger an alert that is provided to a d-member as to how their physical items can be optimized (e.g., improved). In some implementations, the system can provide the d-member with a proposed design (e.g., physical manufacturing plan).

Note that the techniques described in this document can also be implemented in situations where a user is browsing through available applications (e.g., in an online shopping platform or a web browser) or in other environments (e.g., on d-member webpages). For brevity, much of the description that follows will refer to the shopping platform environment.

FIG. 1 is a block diagram of an example environment 100 for providing physical items through a digital platform. The example environment 100 includes a network 102, such as a local area network (LAN), a wide area network (WAN), the Internet, or a combination thereof. Network 102 connects physical item source 110, client devices 120, and physical item digital platform 130 (also referred to as a digital platform). The example environment 100 may include many different physical item sources 110 and client devices 120.

Physical item source 110, or source 110, can be, for example, a d-member, a company, a store, etc., that provides the physical items presented on digital platform 130. In some implementations, source 110 designs and/or manufactures the physical items presented on digital platform 130. Source 110 can provide selected physical items that are requested through digital platform 130 to a requesting user, either by manufacturing the selected physical items, or by sourcing the physical item from a separate manufacturer. For example, source 110 can be a private d-member who manufactures and designs mugs, and provides the mugs to customers who select a particular mug through digital platform 130.

A client device 120 is an electronic device that is capable of requesting and receiving resources over network 102. Example client devices 120 include personal computers, mobile communication devices, and other devices that can send and receive data over network 102. A client device 120 typically includes a user application, such as a web browser, to facilitate the sending and receiving of data over network 102, but native applications executed by client device 120 can also facilitate the sending and receiving of data over network 102.

Interactions between client device 120 and digital platform 130 can include the exchange of one or more digital component tags or digital component scripts that reference digital platform 130. The digital component tags or digital component scripts can be provided to digital platform 130 by client device 120.

In some situations, the digital component tags or digital component scripts are executed by client device 120 when an interaction between client device 120 and digital platform 130 occurs. Interactions can include, for example, transactions such as a purchase of an item, a selection of an item, a request for more information regarding an item, a search performed through digital platform 130, a reference to an item, such as a tag or a link, etc.

Execution of the digital component tags or digital component scripts configures client device 120 to generate a request for a resource including one or more digital components (referred to as a "component request"), which is transmitted over network 102 to digital platform 130. For example, a digital component tag or digital component script can enable client device 120 to generate a packetized data request including a header and payload data. The component request can include event data specifying features such as a name (or network location) of a server from which the digital component is being requested, a name (or network location) of the requesting device (e.g., client device 120), and/or information that digital platform 130 can use to select one or more digital components provided in response to the request. The component request is transmitted, by client device 120, over network 102 (e.g., a telecommunications network) to a server of digital platform 130.

Component requests can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests can be transmitted, for example, over a packetized network, and the component requests themselves can be formatted as packetized data having a header and payload data. The header can specify a destination of the packet and the payload data can include any of the information discussed above.

As used throughout this document, the phrase "electronic document" refers to a discrete unit of digital content or digital information (e.g., a video clip, audio clip, multimedia clip, image, text, or another unit of content). An electronic document can be electronically stored in a physical memory device as a single file or in a collection of files, and digital components can take the form of video files, audio files, multimedia files, image files, or text files and include advertising information, such that an advertisement is a type of digital component. Generally, an electronic document is defined by (or provided by) a single provider or source (e.g., an advertiser, publisher, or other content provider), but could be a combination of content from multiple sources. Electronic documents from multiple different sources can be combined into a single electronic document (e.g., collection of various different digital components), and portions of various electronic documents from different sources can be combined into a single electronic document with information extracted from search results (or other portions of content).

Search engine 150 can direct users to results within a particular digital platform. In this example, search engine 150 searches only through physical items available through digital platform 130. For example, a user can enter a search query containing terms that describe physical attributes of an item the user wishes to find, and search engine 150 can search items available within digital platform 130 to return all relevant item results within digital platform 130.

Physical item digital platform 130 facilitates the organization and display of information about physical items provided by physical item source 110. For example, digital platform 130 can act as a web server responding to requests, such as component requests, from users searching the digital platform 130 for information on physical items or wishing to execute a transaction involving physical items (e.g., purchasing a physical item, configuring the characteristics of a physical item, assigning the physical item, etc.). Digital platform 130 may communicate with other systems, such as database servers, to obtain the physical item information or to facilitate a transaction such as a purchase. Digital platform 130 is used to submit, maintain, and search information about physical items, such as characteristics of the item. In some implementations, digital platform 130 is a distributed computing system that utilizes multiple servers and databases, each of which performs a particular function (e.g., searching, transactional, etc.).

Digital platform 130 can be a computer system that maps physical attributes, and other characteristics, of physical items to the corresponding physical items. A user (e.g., a-member) of digital platform 130 can submit a request to digital platform 130 to view attributes of a particular physical item (e.g., provided by a d-member). Characteristics of physical items can include both physical attributes and non-physical attributes, as discussed above. For example, digital platform 130 can maintain characteristics data of physical items, including their size, shape, color, weight, the material out of which they are constructed, etc. Digital platform 130 can also maintain non-physical attributes of a particular physical item, including average revenue, average required amount, or average distribution volume for the particular physical item. In some implementations, digital platform 130 is an online marketplace that allows users to search for, and purchase, physical items. In another exemplary application, digital platform 130 is a server management application that maintains information on physical servers, for example, can maintain physical attribute data on each server, including the number of active cores, the type of memory architecture used, the type of persistent storage used, etc.

Digital platform 130 includes an attribute detector 132 that detects a set of physical attributes for each physical item among multiple different physical items. Physical attributes can include objective physical attributes, such as a size or color of an item, as well as subjective features, such as the style of the item (e.g., whether it is Bohemian, hipster, antique, etc.) or a classification of the item (e.g., family-friendly, dog-oriented, romantic, fun for parties, etc.) The multiple different physical items can be provided by multiple different physical item sources 110. Attribute detector 132 can identify physical attributes for a particular item based on item properties provided to digital platform 130, such as a datasheet, a product brochure, a standards compliance form, etc. For example, digital platform 130 can receive a datasheet of a physical item, such as a mug, that indicates physical attributes of the mug, such as its size, its shape (e.g., whether it is a round mug, a square mug, a tall mug, etc.), its color, whether the mug is dishwasher, oven, and/or microwave safe, etc. Attribute detector 132 can determine, using the received datasheet, the physical characteristic value for each characteristic and store the information in physical item database 140.

Attribute detector 132 can determine physical attributes of an item using other received information, such as a photo, a video, a written description, etc. For example, attribute detector 132 can use image recognition on a photo of a handmade plate offered by source 110 to determine that the plate is octagonal, blue, and has a striped border. Attribute detector 132 can store these characteristic values in database 140 and map the values to the handmade plate item entry from source 110 within database 140.

Digital platform 130 can store its physical item data in a database, such as physical item database 140. Database 140 stores and logs physical item characteristic data. Digital platform 130 can map physical items and their characteristic data and store the data in database 140. Database 140 can store other item attributes, including the source 110 of the item, the required amount for the item, a location of the item, etc. When digital platform 130 receives a request for data or a user interaction that includes characteristic data of a physical item, digital platform 130 accesses database 140.

Digital platform 130 can also maintain, for example, velocity factors of characteristics of physical items. Velocity factors indicate a direction and magnitude of a change in user interest. For example, user interest in a particular shape of a physical item can be represented by a velocity vector of the shape characteristic. In another example, the number of processor cores in use (or processing units required) to provide information about a particular item to multiple different users within a particular period of time can be represented by a velocity vector of the active core characteristic.

User interest can be measured by a number of metrics, including activity data, number of selections, number of completed transactions through digital platforms, such as digital platform 130, number of tags, links, or interactions, etc. Interest data can be anonymized, aggregated and/or subject to user data preferences to protect user privacy. Digital platform 130 can determine velocity factors for physical attributes by measuring interactions and events that occur on digital platform 130 itself. Digital platform 130 includes a velocity data processor 134 that determines, based on data received by digital platform 130, a velocity factor for a particular characteristic of a physical item. In some implementations, digital platform 130 receives velocity factor data from other digital platforms, servers, etc. The velocity factor data received from other digital platforms can include, for example, activity data from which processor 134 determines velocity factor data.

Digital platform 130 includes a velocity data mapper 136 that maps velocity data of a particular characteristic of a physical item to the characteristic. Mapper 136 maps a contribution of velocity factor to various combinations of physical attributes among a set of physical attributes for multiple different physical items. Mapper 136 identifies the physical item for which attribute detector 132 has detected an attribute, and maps a velocity factor determined by processor 134 to the particular characteristic or combination of characteristics of the physical item for which the velocity factor was determined. Mapper 136 can, for example, perform mapping operations within database 140. The mappings can be maintained as connections or relationships within a data storage structure, such as a pointer within a linked list, a link between objects within a database, etc.

Processor 134 continually receives activity and/or interaction data regarding physical items and their characteristics, and can update a velocity factor for a particular characteristic of a physical item. Processor 134 can receive the activity and/or interaction data at set times or at user-defined times, and in batches or user-defined units. In some implementations, when a velocity factor reaches a threshold value or has reached a particular velocity (e.g., the increase in user searches for, or acquisitions of, pink mugs has increased by a threshold amount within a defined period of time), processor 134 can provide an indication to a source 110 of the physical item.

Digital platform 130 includes a physical item module 138 that facilitates communication between digital platform 130 and source 110 of a physical object. For example, module 138 can be a communications interface between digital platform 130 and source 110. Module 138 also allows digital platform 130 to communicate with other devices related to physical items provided on digital platform 130, such as client devices 120 through the network 102.

Digital platform 130 can provide information to a source 110 through module 138. For example, if processor 134 detects that a velocity factor for a particular characteristic of a physical item has reached a threshold value, digital platform 130 can provide data to source 110 of the physical item through module 138 indicating that the velocity factor has reached the threshold value.

Search engine 150 allows users to search for physical items that are, for example, for sale, for rent, available for use, etc. Users can search for the physical items by entering key terms or phrases that relate to the relevant physical item. For example, a user can enter the name of the item, enter physical attributes of the item, search by the source of the physical item, search by velocity data (e.g., whether an item is trending within digital platform 130).

Figure 2:
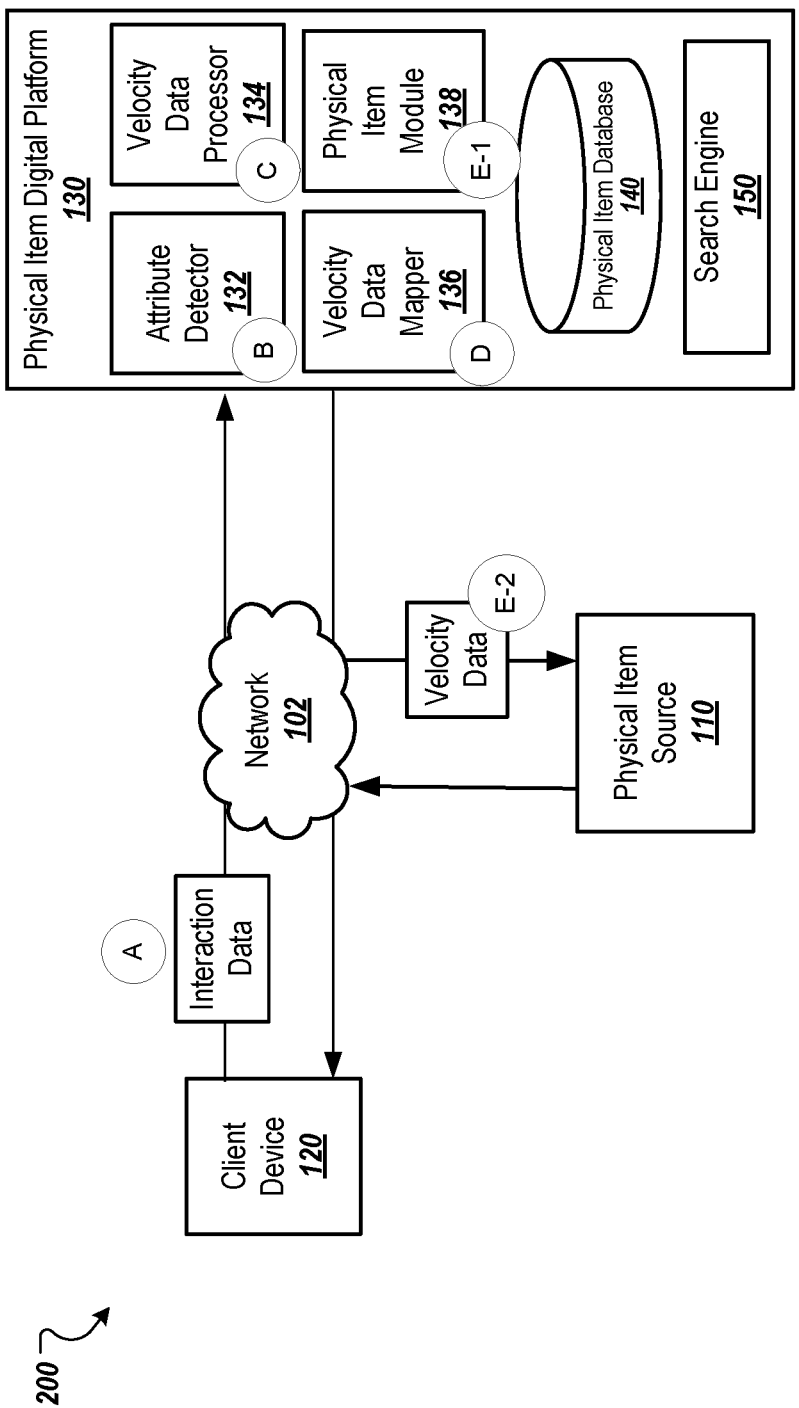
FIG. 2 illustrates a process for analyzing velocity factors of physical items and the effects of changes to physical attributes of the physical items on the velocity factors.

FIG. 2 illustrates a process, or data flow, 200 for analyzing velocity factors of physical items and the effects of changes to physical attributes of the physical items on the velocity factors. Operations of data flow 200 are performed by physical item digital platform 130 contacting multiple devices, including client device 120 and physical item source 110. In some implementations, stages of the flow 200 are performed within a network environment, such as environment 100.

In some examples, client device 120 is a mobile device, such as a cellphone, a smartphone, or a tablet that communicates over a wireless network. Digital platform 130 and source 110 may communicate over a wired network separate from the wireless network over which client device 120 communicates. For example, client device 106 may be a smartphone that communicates over a wireless cellular network, while digital platform 130 and source 110 communicate over wired networks.

The flow 200 begins with stage (A), in which client device 120 provides interaction data to digital platform 130 through network 102. Client device 120 can provide interaction data when communicating with digital platform 130. For example, if a user of digital platform 130 accesses information from digital platform 130 through their client device 120, client device 120 can provide interaction data that indicates the type of interaction, an identifier of client device 120, a time of the interaction, a location of client device 120 at the time of interaction, etc. Interactions can include searches for physical items or attributes of physical items through, for example, search engine 150. Other interactions include transactions performed involving the physical item, such as a purchase or request for use. Digital platform 130 can receive activity or interaction data from other devices, including remote servers or other digital platforms. For example, digital platform 130 can receive activity data from a separate search engine that aggregates search data to determine that a number of searches performed for red and white striped notebooks has increased by over 20% over the past week.

Digital platform 130 generally receives transactional data, such as product sales data. For example, sales of physical items having particular attributes on digital platform 130 performed through client device 120 can be provided to digital platform 130. Interaction data can also include, for example, data generated from user interactions with content related to a particular physical item, such as distribution content.

The interaction data does not need to be associated with a particular physical item, and digital platform 130 can generalize the interaction data to other items that shares attributes with the physical item indicated by the interaction data. For example, digital platform 130 can receive an aggregate of searches for t-shirts on a particular search engine, social platform or mobile application. While the searches are not associated with a single physical item, digital platform 130 can extract data and results to be applied to various t-shirt products within digital platform 130. For example, digital platform 130 can generalize the aggregate data from individual sources 110 that manufacture t-shirts. Data may be aggregated or anonymized in a manner that prevents reversible determination of information related to an individual source, through such methods as removal of long tail data, use of coarse filters, or anonymization. Individual sources, or end users, may be given an option to participate through a set of options available through a centralized site, or through options recorded in an operating system, browser, or via third party settings. Aggregate information and implementations may be restricted in a fashion that it prevents individual sources from using the data to improperly coordinate or communicate on specific products or services.

In some implementations, the interaction data indicates an interaction with a particular physical item provided by a particular physical item source 110, and digital platform 130 can apply the interaction data to the particular physical item, in addition to extrapolating the interaction data to other physical items. For example, digital platform 130 can detect a like from client device 120 for a particular blue table lamp and determine that the number of likes the particular blue table lamp has received over the past week has increased by 200%. In addition, digital platform 130 can apply this determination to other lamps from other sources 110.

The flow 200 continues with stage (B), in which attribute detector 132 determines an attribute of a particular physical item of multiple physical items. The multiple physical items can be provided on digital platform 130, and attribute detector 132 can detect multiple attributes of each item of the multiple physical items. The multiple items can be provided by various different sources 110. If the received interaction data indicates a particular physical item, attribute detector 132 detects attributes of the particular physical item. Attributes of a physical item can include physical attributes discussed above and non-physical attributes, such as a volume of sales of the item, a required amount per item, a profit margin, search volume, etc.

For example, attribute detector 132 can detect multiple attributes of each of multiple water bottles offered for sale on digital platform 130 by a d-member 110. D-member 110 makes each water bottle by hand, and offers water bottles made of glass, stainless steel, and plastic. Attribute detector 132 can detect attributes for each water bottle, including the material out of which it is made, the fluid ounce capacity, the color, the shape, whether there is a design on the outside of the bottle, and what the design is. Attribute detector 132 can apply various techniques to detect the attributes of the bottles, including receiving user input from d-member 110 and applying image recognition to photos uploaded by d-member 110.

Attribute detector 132 can, for example, infer physical attributes or physical attributes that are likely to belong to the physical item. Attribute detector 132 determines these attributes based on a combination of data received, such as an external data set, business assumptions received as input, etc.) and/or observed or inferred physical attributes of other objects for which the digital platform 130 has information.

The flow 200 continues with stage (C), in which velocity data processor 134 determines a velocity factor for the attribute of the physical item, or updates an existing velocity factor. Processor 134 can use a stored set of rules to determine whether to provide an alert regarding a particular velocity factor. For example, processor 134 can make rules-based recommendations to a source 110 of a particular physical item by determining whether a velocity factor for a particular product type has reached a threshold value, or changed by a threshold amount. If processor 134 determines that a velocity factor for red and green sweaters has decreased by a threshold amount within the past two weeks, indicating that holiday season interest in festive, red and green sweaters has declined, processor 134 can alert source 110 to reduce, or stop, production of red and green sweaters. In some implementations, when a velocity factor reaches a threshold value or has reached a particular velocity (e.g., the increase in a-member searches for pink mugs has increased by a threshold amount within a defined period of time), processor 134 can provide an indication to a source 110 of the physical item.

Processor 134 generates a velocity factor for a given physical item attribute by, for example, quantifying the influence of the attribute on the user interest relative to other attributes of the physical item. Each velocity factor is an indication as to why a particular item is sought after. For example, a large velocity factor of a color attribute of the physical item indicates that the color (e.g., red) is correlated with a-member interest.

A particular physical item can have a single velocity factor—processor 134 can generate a single velocity factor for the physical item by aggregating the available velocity factors for the attributes of the physical item, or simply an indication of a-member interest in the physical item. For example, processor 134 can determine a weighted average of the attributes of the physical item and their corresponding velocity factors for a particular physical item. Attributes can be weighted based on various metrics, including whether its velocity factor is positive or negative, the magnitude of the velocity factor, user-input indicating the relative importance of the attribute to the physical item, etc.

In some implementations, the velocity factor can be based on a periodic or cyclical change in acquisitions over a specified time. For example, assume that acquisitions of a particular product rise by 20% during a particular month each year. In this example, the cyclical increase can be determined and/or learned by the processor 134, and used to generate the velocity factor for the particular product. More specifically, the processor 134 can either increase or decrease the velocity factor based on the known/expected acquisition increase. The velocity factor can be increased, for example, to account for the fact that the acquisitions are expected to rise during that particular month. The velocity factor could alternatively be decreased so as to disconnect the cyclical increase from an increase that may result from changing a product. For example, it may be preferable to negate the cyclical increase if it is unrelated to any particular physical attributes or combination of physical attributes of the particular product. In this example, the velocity factor generated by the processor 134 can be reduced to offset the portion of the velocity factor that is attributable to the cyclical acquisition increase.

In some implementations, the periodic or cyclical change can be determined on a per-physical-attribute basis. For example, assume that every October, orange sweaters are more popular (e.g., have a higher acquisition rate) than white sweaters, but that every January, white sweaters are more popular than orange sweaters. In this example, the change in popularity (e.g., acquisition rate) is both periodic/cyclical in nature and attributable to a physical attribute (e.g., color) of the sweater. As such, the velocity factor for orange sweaters can be increased relative to that of white sweaters, and in January the velocity factor for white sweaters can be increased relative to orange sweaters.

Processor 134 can analyze multiple velocity factors to generate a recommendation to a source 110. For example, processor 134 can analyze velocity factors for a variety of colors, shapes, and sizes of mugs, and can generate a recommendation for the combination of attributes that has been most popular among customers on digital platform 130. In some implementations, processor 134 can provide a recommendation that requires the least amount of change from the current physical attributes of the physical items that d-member 110 provides. For example, if d-member 110 currently provides purple, square mugs with curved handles, and processor 134 has determined that purple, round mugs with square handles have been performing better with customers of digital platform 130 than the mugs that d-member 110 currently offers, processor 134 can provide a recommendation to d-member 110 to make a physical change to the mugs to provide square handles, as d-member 110 has indicated that the shape of the handles is easier to change than the shape of mug itself. In some situations, the amount of change required can be determined based on a distance (e.g., cosine distance) between a vector (e.g., a velocity vector or similar vector) representing the current physical attributes of the items and another vector representing the target physical attributes.

Processor 134 can analyze a cost function in addition to multiple velocity factors to generate a recommendation to a source 110. For example, processor 134 can apply a negative cost function, such that each time an action is taken, a cost is incurred, and processor 134 can minimize the total cost for source 110. The actions can include, for example, providing separate instances of distribution content, providing separate targeted offers, etc. Processor 134 can apply machine learning techniques such as reinforcement learning to optimize against a cost value—either an incurred cost or a budgeted cost. Because an incurred cost cannot be determined until an action is taken, processor 134 can apply inference methods (e.g., expectation of value, deep Q-learning, or other techniques) to a budgeted cost model to optimize a recommendation provided to source 110.

In some implementations, actions taken by source 110 are free, but have a true cost in terms of resources used, amount of time needed, effects on reputation of source 110, etc. For example, if a source 110 is choosing between organic marketing on a digital platform different from digital platform 130 and promoted listings within digital platform 130, processor 134 can determine that organic marketing on the digital platform different from digital platform 130 requires time and reach (e.g., an audience).

Processor 134 can optimize for a metric specified by a d-member 110. For example, physical item source 110 can specify whether processor 134 should optimize for a metric such as average revenue per order, average required amount per product, average sales volume, etc. If physical item source 110 specifies multiple metrics across which it would like to processor 134 to optimize, processor 134 can select a particular metric across which to optimize the machine learning model.

In some implementations, processor 134 can analyze activity data that is not explicitly associated with a physical item, and can output a predicted velocity factor for a particular physical attribute. For example, if a new movie that features an island full of green dogs premiered and has been doing well at the box office, digital platform 130 can gather activity data from other platforms (or online channels) and sources on which people are discussing the movie and can determine that green physical items, even those not related to dogs, have a predicted positive velocity factor, or an increase in interest due to the overall level of interest in the movie. In this example, processor 134 can determine that physical items that are both green and related to dogs have a predicted positive velocity factor of a large magnitude, and physical items featuring green dogs may have the highest predicted velocity factor. Processor 134 can combine techniques, such as image recognition and a machine learning model to identify potential features of physical items that may have changes in velocity factors.

Processor 134 can analyze velocity vectors to generate a recommendation to a source 110. In some implementations, processor 134 can analyze a velocity vector for a physical item to generate a recommended d-member 110 action to be performed. For example, if a particular physical item has multiple attributes and corresponding velocity factors, processor 134 can aggregate the multiple velocity factors into a single velocity vector. The velocity vector for a physical item represents an overall velocity, or distribution, score for the physical item, and can indicate an overall trajectory of user interest in the physical item. Processor 134 can detect a change in a velocity vector—in other words, a trajectory for the physical item as a whole—and generate a recommendation for d-member 110. For example, if d-member 110 produces multiple staplers of different shapes and materials, and each of the staplers has a velocity vector that indicates a declining interest, processor 134 may suggest that d-member 110 ceases production of staplers, instead of suggesting changes to particular physical attributes of the multiple different staplers.

When generating a set of training data for its machine learning model, processor 134 selects training features used within the set of training data from historical activity and/or interaction data. Processor 134 can apply weights to the training examples. For example, processor 134 can weight each training example equally and sample only data points within a predetermined period of time. In some implementations, training data generator 108 can using decay functions, explore-exploit reinforcement learning methods, or other statistical methods to weight training examples differently depending on how recent the example is.

Digital platform 130 can split training, validation, and generating test data into various percentages of modelling time and resources. Digital platform 130 can also cross validate the output of the model. Digital platform 130 can automatically optimize the machine learning model, for example, by performing A/B testing.

Processor 134 trains a machine learning model to determine a velocity factor for each of multiple attributes of a particular physical item. The machine learning model may use any of a variety of techniques such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, perceptrons, association rules, inductive logic, clustering, maximum entropy classification, learning classification, etc. In some examples, the machine learning model uses supervised learning, or semi-supervised learning in which the ground-truth values of only a subset of examples are known. In some examples, the machine learning model uses unsupervised learning. The machine learning model can also use wide and deep learning, long short-term memory modeling, boosting, matrix factorization, user embedding, or item embedding.

For ease of explanation, the operation of processor 134's machine learning model is described with respect to reinforcement learning, but it is understood that the machine learning model could utilize any of a number of other techniques as described above, including bandit-theory driven machine learning.

Processor 134 can input determined velocity factors to a machine learning model that outputs a recommendation for changes that a source 110 should make to physical attributes of the physical items they offer. For example, if a processor 134 inputs velocity factors that indicate that large, round beach towels with turtle designs are decreasing in popularity among a-member of digital platform 130, the machine learning model can output a suggestion to d-member 110 to reduce its inventory of large, round beach towels, but to maintain a stock of the towels.

The flow 200 continues with stage (D), in which velocity data mapper 136 maps the determined velocity factor to the corresponding attribute or combination of attributes of the physical item. Mappings can be stored within database 140. Mapper 136 can identify physical items and physical attributes of those physical items to which velocity factors determined by processor 134 can be mapped.

Mapper 136 can identify, from a velocity factor, the indicated physical attribute for which the velocity factor was calculated, and can analyze physical items within database 140 of digital platform 130 to identify physical items having physical attributes that relate to the indicated physical attribute. For example, mapper 136 can crawl database 140 to identify all keychain products and map the velocity factor for the color green as applied to keychains to the identified products. Mapper 136 can use a threshold number of matching attributes to determine whether to identify a product to which a velocity factor is mapped. For example, mapper 136 can determine that a velocity factor for a round shape as applied to a drink coaster can be mapped to other physical items that are of the drink coaster type and to other items that are similarly flat, but cannot be applied to, for example other objects such as bowls, spoons, t-shirts, etc. because of their lack of other overlapping features (e.g., their lack of similarity). Mapper 136 can also map velocity factors based on source 110 attributes. For example, two similar sources 110 can be expected to provide similar items.

The flow 200 continues with stage (E), shown in parts (E-1) and (E-2), in which digital platform 130 provides velocity data to source 110. For example, physical item module 138 can act as a communications interface between digital platform 130 and source 110. Physical item module 138 provides the determined velocity data (or other information summarizing the determined velocity data) to source 110. In some implementations, the velocity data can include a recommendation based on the velocity factors. For example, the velocity data can include a recommendation to source 110 to increase production of stuffed dogs instead of stuffed bears, because data from a different online channel indicates that a recent children's movie was released that featured many dogs and/or search data indicates that there has been a spike in searches for stuffed dogs.

The flow 200 can continue with stage (A) again, in which a client device 120 provides interaction and/or activity data to digital platform 130. In stages (A) and (E), digital platform 130 receives data it uses to generate or update a velocity factor of a particular physical item or attribute of a physical item. The interaction and/or activity data indicate a level of user interest. By accepting data about how well-received physical items are, an a-member's satisfaction level regarding physical items, other information from a-members or third party, processor 134 of digital platform 130 implements a closed loop system such that digital platform 130 achieves and maintains a d-member 110 goal automatically. The goal can be defined, for example, by d-member 110, or can be automatically determined for d-member 110 based on historical behavior and interactions of d-member 110.

Digital platform 130 bases its recommendations on the feedback information it receives from client 120 or sources such as other digital platforms or devices. Digital platform 130 closes the loop by monitoring changes to velocity factors, that represent, for example, changes in a popularity of an item, changes in required amount, changes in distribution volume, etc., to provide recommendations to a manufacturer of the product based on empirical consumer data.

Interactions with an item, such as liking the item, adding the item to a shopping cart or wishlist, purchasing the item, etc., can be used as a positive training example for the machine learning model.

Processor 134 can provide recommendations for changes to other attributes of the listing of a physical item by source 110. For example, if source 110 is a d-member that manufactures the physical items it sells on digital platform 130, processor 134 can suggest actions that can be performed on digital platform 130. Processor 134 can suggest that d-member 110 promote a listing that has a set of attributes with high velocity factors to increase competitiveness in a heated market for physical items with the set of attributes, by promoting the listing within search results, including the listing in targeted offers (e.g., coupons, advertisements, etc.), or changes to the promotion strategy on other digital platforms (e.g., changing promotions on other websites, digital platforms, servers, etc.).

Digital platform 130 can provide recommendations to a d-member 110 for items that don't yet exist. For example, based on the feedback information it receives from client 120 or sources such as other digital platforms or devices, digital platform 130 can suggest to d-member 110 to begin offering a particular item with particular physical attributes. If d-member 110 does not yet produce the item, digital platform 130 can suggest a listing for the item that d-member 110 can use on digital platform 130. For example, digital platform 130 can generate a photo and/or item description and allow d-member 110 to take pre-orders of the item or provide a graphical user interface element to allow other users of digital platform 130 to indicate their interest in the item.

The single velocity factor for a particular physical item represents an overall velocity of the physical item. Processor 134 calculates the single velocity factor using an average of the separate velocity factors, and as described above, can apply weights to each velocity factor. Processor 134 can select weights for each velocity factor based on, for example, a correlation between an attribute corresponding to the velocity factor and an increase in velocity. For example, processor 134 can determine, as described above, that a number of physical items experiencing an increase in velocity factors have one or more attributes in common. The common attributes can be weighted proportionally to the effect of the attribute on the increase in velocity. In some implementations, processor 134 weighs each velocity factor equally. Processor 134 can apply machine learning to determine the weights for each velocity factor. For example, processor 134 can utilize feedback provided to digital platform to adjust the weights for each velocity factor. Processor 134 can also apply benchmarking to determine whether the results of its adjusted weights and velocity factor-driven recommendations meet a threshold performance level.

Processor 134 accounts for historical actions taken by source 110 to determine the optimal recommendation to provide source 110. For example, processor 134 can determine that, over the lifetime of its storefront on digital platform 130, d-member 110 has had success with off-platform integration, but has not had success with targeted offers. Processor 134 can then recommend to source 110 to increase off-platform integration efforts for items having physical attributes with high velocity factors, maintaining the brand image and reputation of source 110 for having strong off-platform integration.

In some implementations, processor 134 considers user input from a d-member 110 to determine whether an attribute is a positive or a negative training example for the machine learning model. For example, processor 134 can apply image recognition and processing to group together similar images of products that have a threshold velocity factor value, and provide the group to a user for classification as a positive or negative training example, and identification of the attribute mapped to the largest velocity factor contribution.

Processor 134 can provide, as input to its machine learning model, the sequencing of actions of a source 110 to customize recommendations for source 110. For example, if a d-member 110 that produces socks with firework designs is highly interested in promotional listings, and places higher bids on promotional listings around July $4^{th}$, processor 134 can weigh the time period around July $4^{th}$ more heavily in the machine learning model for d-member 110. If source 110 is a seasonal d-member that specializes in winter-weather accessories such as scarves and hats, processor 134 can monitor seasonal trends in interest, and can adjust training examples for its machine learning model such that a decline in interest in d-member 110's items as outdoor temperatures increase are not necessarily interpreted as negative. As source 110 grows and its behavior changes, processor 134 can update its machine learning model such that its recommendations change with source 110. For example, processor 134 can provide a d-member 110 that grows from a single artisan who makes each item by hand to several artisans who mass produce some items and make some items by hand with optimal recommendations for d-member 110's current stage of growth.

Processor 134 can generalize its recommendations across different vendors having similar products or inventory. For example, processor 134 can generalize its recommendation for a particular d-member 110 who distributes socks, as the target audience on digital platform 130 is likely to be similar, and recommend investing a threshold amount of d-member 110's budget in targeted offers.

Processor 134 applies multiple models for multiple physical attributes. For example, processor 134 can generate and update one machine learning model for each physical attribute relevant to a source 110 or a physical item provided by source 110. In some implementations, processor 134 can apply a single model for multiple physical attributes.

Figure 3A:
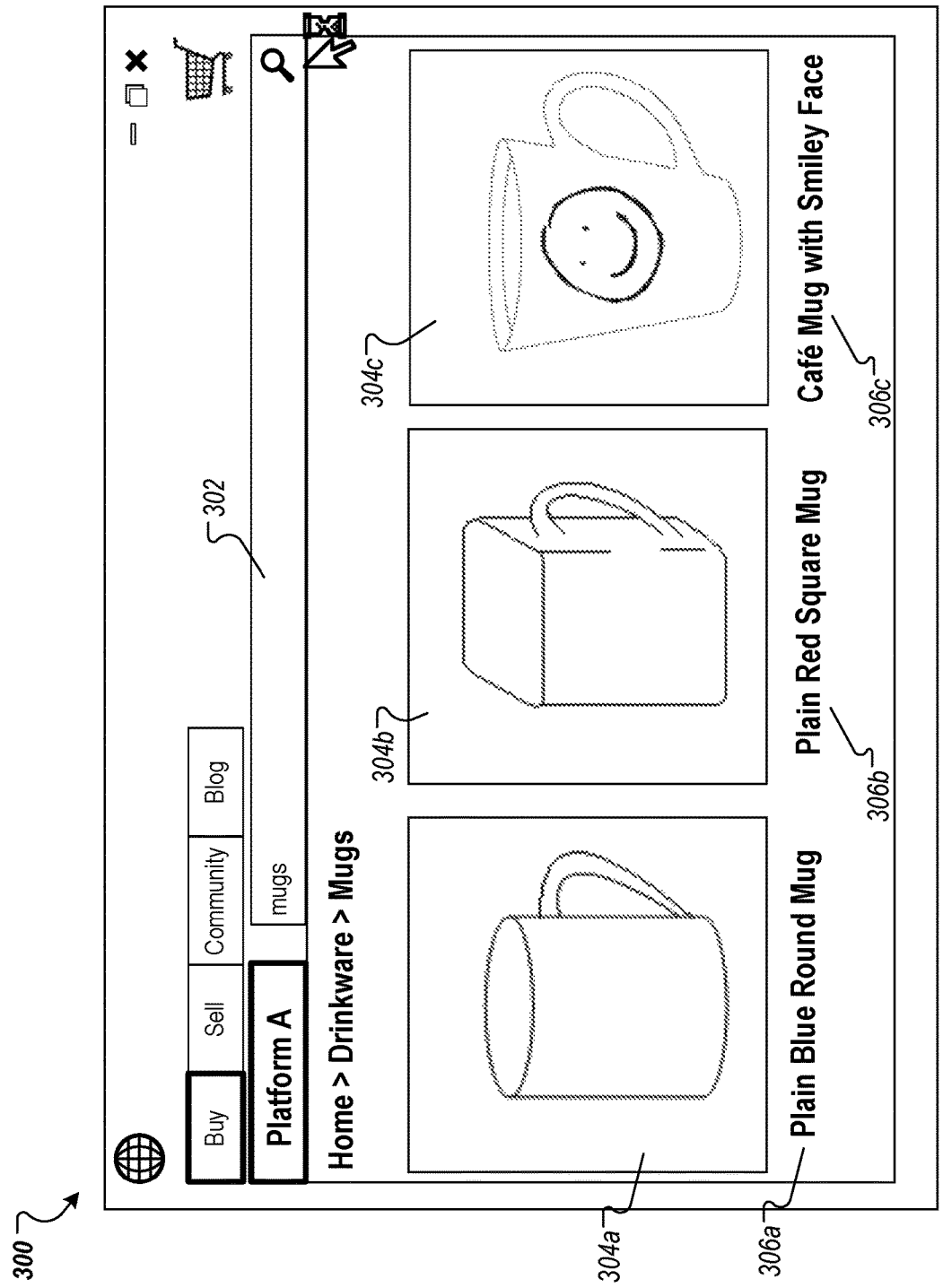
FIGS. 3A and 3B illustrate example user interfaces for the physical item digital platform.

FIG. 3A illustrates an example user interface 300 for the physical item digital platform. For example, the physical item digital platform can be implemented by a server, such as digital platform 130, communicably connected by a network, such as network 102, to a client device, such as client device 120.

A user (e.g., an a-member) of digital platform 130 can input a search query 302 to a search engine, such as search engine 150, indicating a query for which the a-member is interested in seeing results. Digital platform 130 can provide the search results to the a-member from a repository, such as database 140. In this example, digital platform 130 is a digital marketplace that allows a-members to purchase items on digital platform 130.

Image 304a illustrates a physical item that is described by item description 306a. In this example, the physical item is a plain blue round mug. Image 304b illustrates a physical item that is described by item description 306b. In this example, the physical item is a plain red square mug. Item 304c illustrates a physical item that is described by item description 306c. In this example, the physical item is a café mug with a smiley face design. Item descriptions 306a, 306b, and 306c can be generated by processor 134 by applying image recognition, detecting the attributes from a submitted datasheet, or receiving input from a provider of the product, such as source 110, a d-member.

As described above, interaction data can be generated and provided when a user, such as an a-member, interacts with the physical items as depicted in images 304a, 304b, and 304c (collectively, images 304). Each of the physical items as depicted in images 304 is provided by a physical item source 110. In some implementations, the physical items can be provided by different sources 110.

Figure 3B:
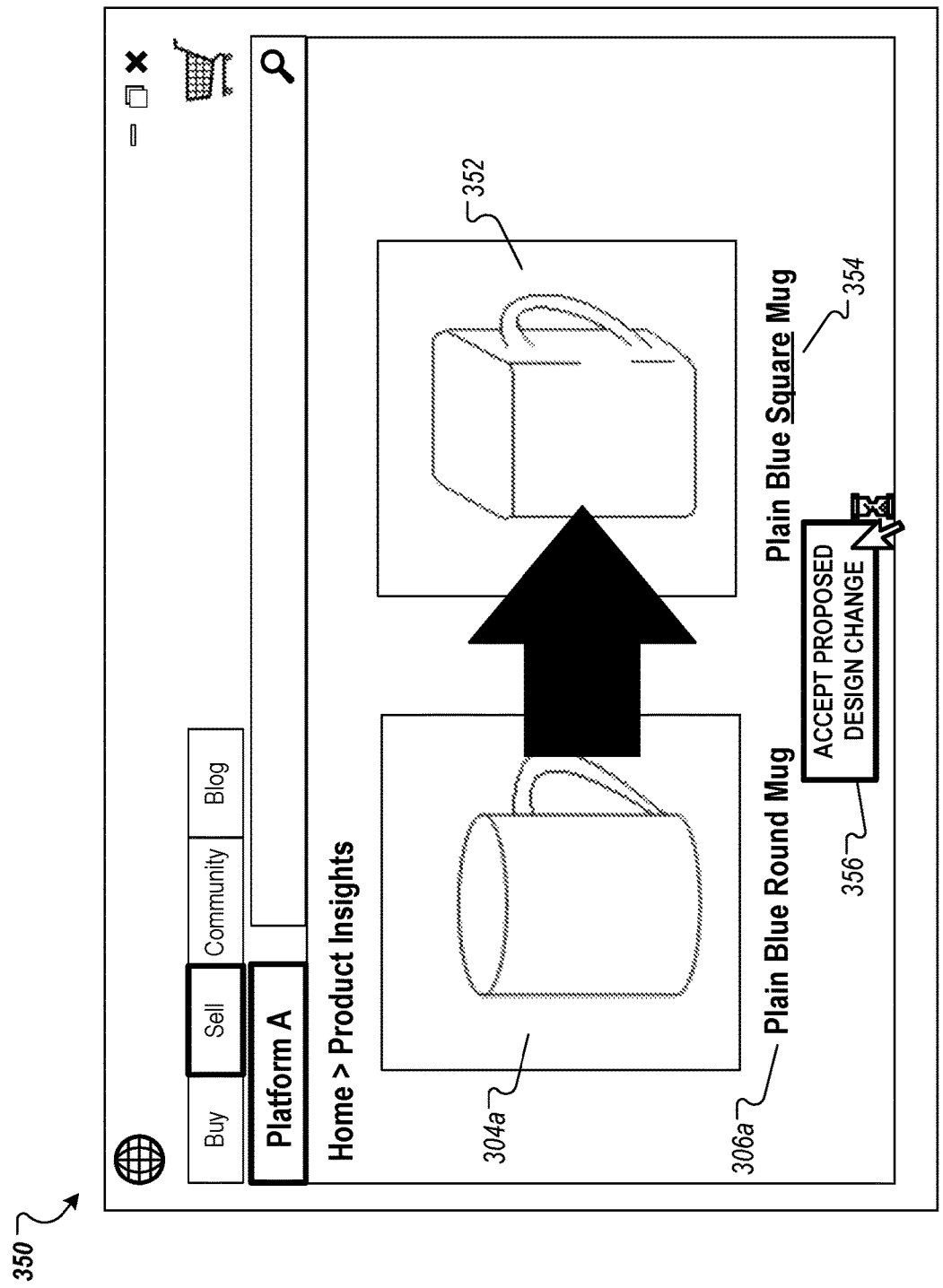

FIG. 3B illustrates an example user interface 350 for the physical item digital platform. For example, the physical item digital platform can be implemented by a server, such as digital platform 130, communicably connected by a network, such as network 102, to a client device, such as client device 120.

A user (e.g., a d-member 110) of digital platform 130 can view insights generated by digital platform 130 specifically for d-member 110. In this example, digital platform 130 is a digital marketplace that allows a-members to purchase items on digital platform 130.

Image 352 illustrates a proposed design for physical item 304a. The proposed design illustrated in image 352 is described by item description 354. In this example, the proposed design physical item is a plain blue square mug, which is a change from the physical item 304a—a plain blue round mug. Item description 354 can be generated by processor 134 based on identified attributes common to a set of physical items that have reached a threshold velocity factor value. Item descriptions can visually distinguish proposed changes from a physical item. In this example, item description 354 depicts the change in shape from round to square in bold.

User interface (UI) element 356 is a graphical user interface element that accepts user input. D-member 110 can provide input approving of the proposed design change to physical item 304a. UI element 356 can receive user input and implement the proposed design change, and in this example, UI element 356 is a button. UI element 356 can provide data to digital platform 130 indicating that a proposed design change has been accepted. Digital platform 130 can then update the listing of the physical item as depicted in image 304a within digital platform 130 to display image 352, item description 354, and other characteristics of the physical item depicted in image 352. For example, d-member 110 can accept the proposed change to the shape of plain blue round mug as depicted in image 304a to a plain blue square mug as depicted in image 352 by clicking on button 352. Digital platform 130 then updates the listing within digital platform 130 for d-member 110's physical item depicted in image 304a and described by item description 306a.

In some implementations, interacting with UI element 356 can result in submitting an order for appropriate materials needed to manufacture the physical item with one or more different features, updating manufacturing scripts and/or equipment, making changes to the manufacturing process, etc. For example, d-member 110 can accept the proposed change by clicking on button 352, and digital platform 130 can submit an order over network 102 for a square mug mold, update a programming script for a machine that shapes mugs to make square mugs, inform d-member 110's manufacturing shop to switch to square mug molds, etc. Digital platform 130 can submit, for example, an order for less expensive and more space-efficient packing materials because of the change in shape of the mugs. Digital platform 130 can be integrated with d-member 110's manufacturing and/or distribution process such that changes necessary to implement the proposed design changes are made automatically upon receiving input from d-member 110 indicating permission.

In some situations, the digital platform 130 can also provide the d-member 110 with one or more recommendations as to how physical items should be promoted. For example, the digital platform 130 can evaluate historical actions taken by the d-member 110, attributes of the physical products being distributed by the d-member 110, and/or other information to provide suggestions as to which channels should be used to inform users of the availability of the physical product.

Figure 4:
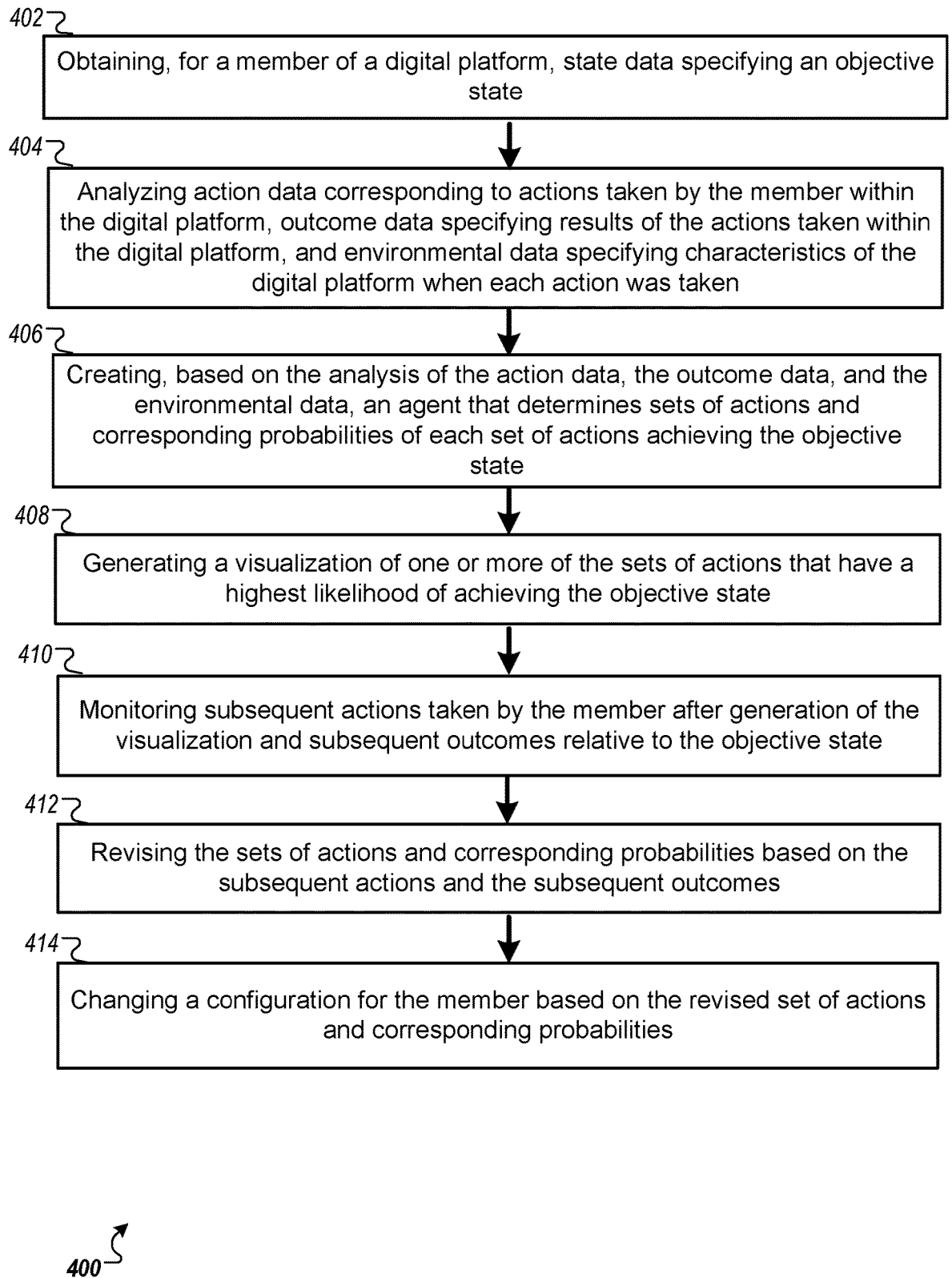
FIG. 4 is a flow chart of an example process for modifying a configuration based on state data.

FIG. 4 is a flow chart of an example process 400 for modifying a configuration based on state data. In some implementations, the process 400 can be implemented by a physical item digital platform, such as digital platform 130 of system 100. In some implementations, the process 400 can be implemented as instructions stored on a non-transitory computer readable medium, and when the instructions are executed by one or more servers, the instructions can cause the one or more servers to perform operations of the process 400.

The process 400 begins when the system obtains, for a member of a digital platform, such as digital platform 130, state data specifying an objective state (402). For example, digital platform 130 can receive input from source 110 specifying a goal—for example, increasing revenue by 215% within the next two years. The objective state can include a state of manufacturing equipment, a state of inventory, a target return on interest, etc.

The process 400 continues when the system analyzes action data corresponding to actions taken by the member within the digital platform, outcome data specifying results of the actions taken within the digital platform, and environmental data specifying characteristics of the digital platform when each action was taken (404). For example, processor 134 of digital platform 130 can analyze the received interaction and/or activity data and the outcomes of the activity, such as whether a sale was successfully completed or how much a product sold for. Environmental data can include, for example, settings of the user's (either an a-member or a d-member) digital platform interface, source 110's previous actions, the stage at which source 110 is in its development, etc. By accepting data regarding the performance of the system toward a goal, processor 134 completes a closed loop and continually updates the model based on feedback from interaction and/or activity data.

The process 400 continues when the system creates, based on the analysis of the action data, the outcome data, and the environment data, an agent that determines sets of actions and corresponding probabilities of each set of actions achieving the objective state (406). For example, processor 134 of digital platform 130 can create a model based on the analysis of the action data, the outcome data, and the environment data, to generate a set of velocity factors. In some implementations, the model is rules-based. The model can be a machine learning model, and processor 134 can train the machine learning model using examples from previous action data. The model provides, as output, a probability of achieving the specified goal.

The process 400 continues when the system generates a visualization of one or more of the sets of actions that have a highest likelihood of achieving the objective state (408). For example, mapper 136 can map the determined velocity factors to attributes or various combinations of physical attributes of the product. Mapper 136 can determine a contribution of each velocity factor as correlated to a physical attribute or combination of attributes. As described above, digital platform 130 can select the velocity factor and corresponding attributes that have a highest likelihood of achieving the specified goal, or, the velocity factor having the largest magnitude.

The process 400 continues when the system monitors subsequent actions taken by the member after generation of the visualization and subsequent outcomes relative to the objective state (410). For example, digital platform 130 can continue to receive interaction and/or action data, and processor 134 can update the velocity factors for particular physical items based on newly received data.

The process 400 continues when the system revises the set of actions and corresponding probabilities based on the subsequent actions and the subsequent outcomes (412). For example, processor 134 can update the models based on the updated velocity factors.

The process 400 continues when the system changes a configuration for the member based on the revised set of actions and corresponding probabilities (414). For example, digital platform 130 can implement changes to a configuration based on the updated velocity factors. Physical item module 138 can communicate the changes to source 110 of the physical item.

Figure 5:
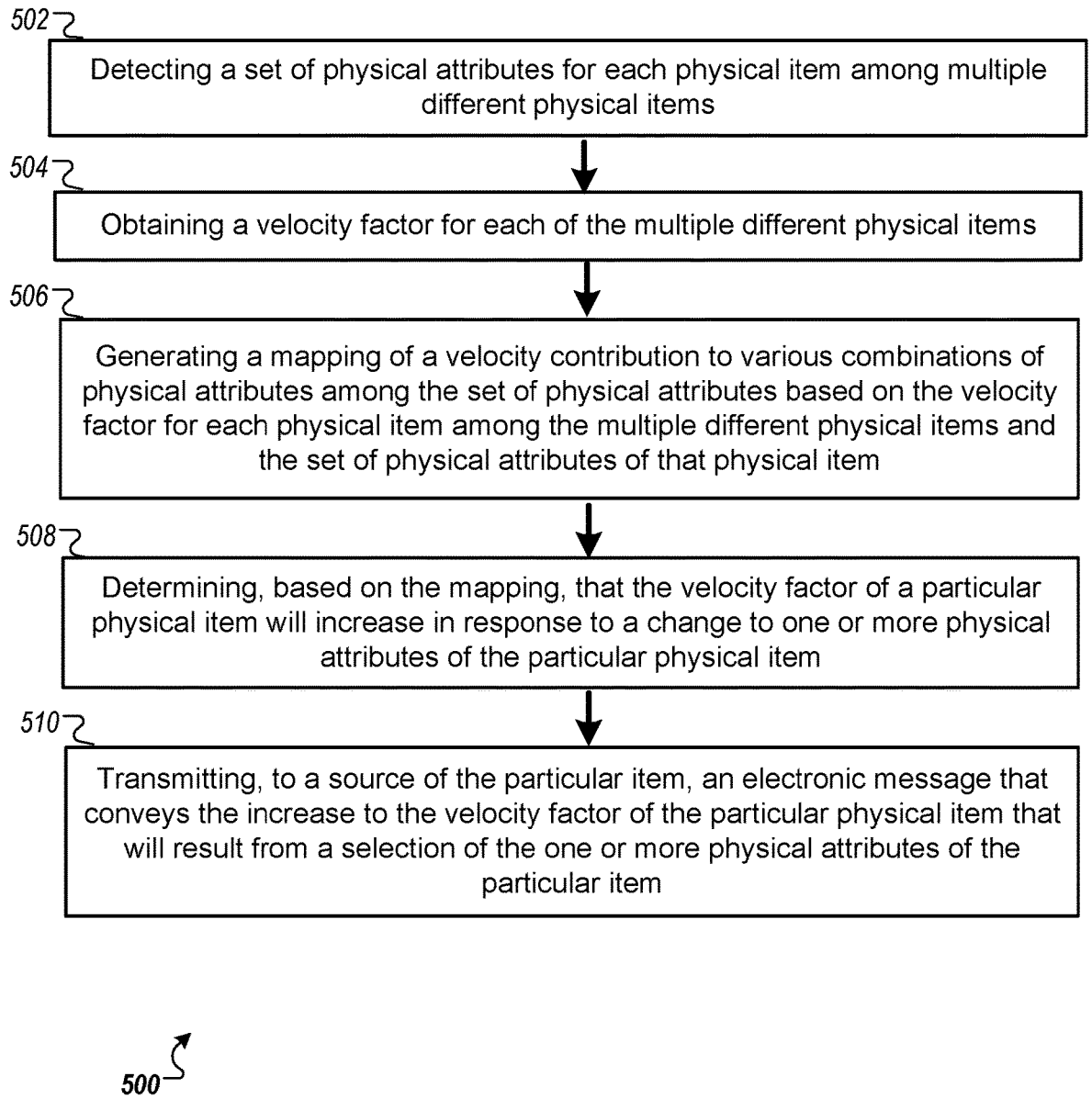
FIG. 5 is a flow chart of an example process for alerting the source of a physical item of changes detected in a velocity factor of the physical item based on changes to physical attributes of the item.

FIG. 5 is a flow chart 500 of an example process for alerting the source of a physical item of changes detected in a velocity factor of the physical item based on changes to physical attributes of the item. In some implementations, the process 500 can be implemented by a physical item digital platform, such as digital platform 130 of system 100. In some implementations, the process 500 can be implemented as instructions stored on a non-transitory computer readable medium, and when the instructions are executed by one or more servers, the instructions can cause the one or more servers to perform operations of the process 500.

The process 500 begins when the system detects a set of physical attributes for each physical item among multiple different physical items (502). For example, as described above with respect to FIGS. 1 and 2, attribute detector 132 can detect a set of physical attributes for a physical item. In some implementations, attribute detector 132 detects attributes that are non-physical.

Processor 134 analyzes each physical item in a number of physical items to identify a set of items for which particular velocity factor or a threshold velocity factor is achieved. Processor 134 receives continuous feedback, and in some implementations, processor 134 can identify a set of items for which a particular action is taken. Processor 134 can monitor received information for a particular quantity or magnitude, or a particular impact that will result from the actions taken for every quantitative unit of change. For example, processor 134 can determine that for every shade lighter of pink that the mug is made, d-member 110 could sell, on average, 20 more mugs. For example, processor 134 can identify a set of items that are increasing in user interest velocity factors by at least 10% over the past three days. The processor 134 then identifies a set of attributes common to each of the physical items within the set of physical items. Each of the identified attributes can contribute to the increase in user interest velocity factors, and therefore digital platform 130 can analyze the predicted effect of each attribute to select one or more of the attributes to address in its recommendation to d-member 110 that provides a particular physical item that shares the common attributes. As described above, digital platform 130 can utilize a machine learning model that applies reinforcement learning to identify the set of physical items with a threshold velocity factor and/or to identify the common attributes. In some implementations, digital platform 130 can receive user input to identify the set of physical items or the attributes common to the set of physical items.

The process 500 continues when the system obtains a velocity factor for each of the multiple different physical items (504). For example, as described above with respect to FIGS. 1 and 2, velocity data processor 134 can obtain a velocity factor for each physical item. In some implementations, processor 134 calculates the velocity factor. Processor 134 can also receive the velocity factor or detect the velocity factor for the particular physical item.

The process 500 continues when the system generates a mapping of a velocity contribution to various combinations of physical attributes based on the velocity factor for each physical item among the multiple different physical items and the set of physical attributes of that physical item (506). For example, as described above with respect to FIGS. 1 and 2, velocity data mapper 136 can map the velocity contribution of different attributes or combinations of attributes based on the obtained velocity factor. Mapper 136 can determine, based on the mappings, whether a set of products has achieved a particular threshold amount of revenue, and identify the set of products.

The process 500 continues when the system determines, based on the mapping, that the velocity factor of a particular physical item will increase in response to a change to one or more physical attributes of the particular physical item (508). For example, as described above with respect to FIGS. 1 and 2, processor 134 can determine, based on the mappings, that a particular attribute or combination of attributes out of the multiple different attributes and combinations has a largest contribution, or effect, on the velocity factor. A velocity factor can increase or decrease, indicating an increase in activity and/or interactions or a decrease in activity and/or interactions, respectively.

The process 500 continues when the system transmits, to a source of the particular item, an electronic message that conveys the increase to the velocity factor of the particular physical item that will result from the selection of the one or more physical attributes for the particular item (510). For example, as described above with respect to FIGS. 1 and 2, physical item module 138 can communicate over network 102 with physical item source 110 to convey the increase of the velocity factor of the item. In this example, an increase in velocity factor indicates an increase in consumer interest, and by alerting source 110 to the increase in interest, digital platform 130 allows sources 110 to be more efficient with their stocking and manufacturing practices. Processor 134 implements a closed loop system by accepting data regarding the performance of the system toward a goal and continually updating the model based on feedback from interaction and/or activity data. In some implementations, the selection of the one or more physical attributes for the particular item includes changing a physical attribute of the particular item (e.g., changing how the particular item is manufactured). In some implementations, the selection of the one or more physical attributes for the particular item includes the source 110 promoting items having the one or more physical attributes over other items that do not have the one or more physical attributes.

Figure 6:
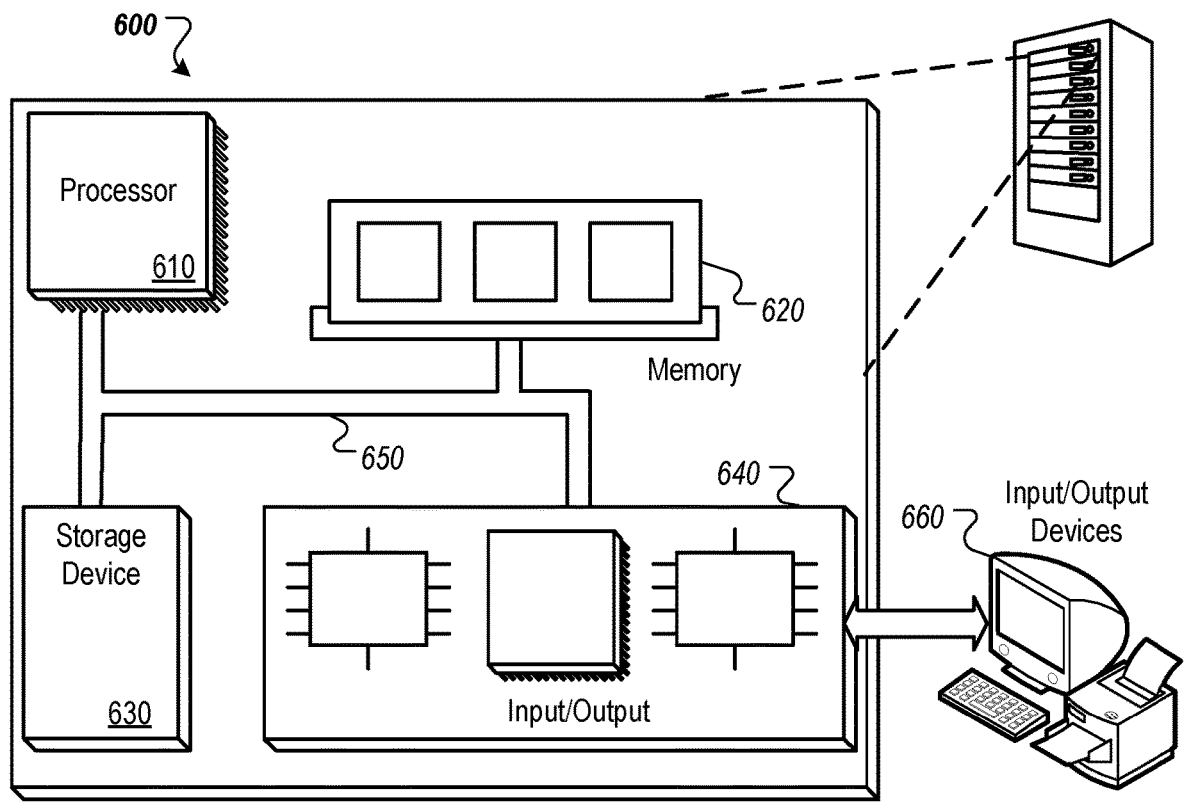
FIG. 6 is a block diagram of an example computing system.

FIG. 6 is block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 450. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 400. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA (field-programmable gate array) or an ASIC (application-specific integrated circuit).

Processors suitable for the execution of a computer program include, by way of example, both general and special-purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
   detecting, by one or more data processing apparatus, a set of physical attributes of a physical item;
   obtaining, for each particular physical attribute among the set of physical attributes of the physical item, a corresponding velocity factor representing a change in volume of online searches for physical items having the particular physical attribute in a specified time period relative to the volume of online searches in a prior time period, wherein each corresponding velocity factor indicates (i) a direction and (ii) a magnitude of change over time of user interest in the particular physical attribute of the physical item;
   generating, for each different combination of physical attributes among multiple different combinations of physical attributes of the physical item, a velocity vector from a collection of the corresponding velocity factors of the physical attributes included in the different combination of physical attributes;
   generating a mapping of the velocity vectors to the different combinations of physical attributes;
   predicting, based on the mapping of the velocity vectors to the different combinations of physical attributes of the physical item, that the velocity factor of the physical item will increase in response to a change to one or more physical attributes of the physical item; and
   transmitting, to a source of the particular item, an electronic message suggesting modifying the physical item to have the combination of physical attributes mapped to velocity vector that led to the prediction that the increase to the velocity factor of the physical item.

2. The method of claim 1, wherein generating a mapping comprises creating a machine learning model that applies reinforcement learning.

3. The method of claim 1, wherein transmitting an electronic message comprises transmitting instructions that, when executed by the source of the particular item, cause a change to the one or more physical attributes of the particular item.

4. The method of claim 1, wherein generating a mapping comprises analyzing a negative cost function.

5. The method of claim 1, wherein detecting a set of physical attributes items comprises performing image recognition.

6. The method of claim 1, wherein obtaining a corresponding velocity factor includes determination of a cyclical or periodic change in acquisitions over at least one of time or physical attributes.

7. A system comprising:
at least one processor; and
a memory communicatively coupled to the at least one processor, the memory storing instructions which, when executed by the at least one processor, cause the at least one processor to perform operations comprising:
  detecting a set of physical attributes of a physical items;
  obtaining, for each particular physical attribute among the set of physical attributes of the physical item, a corresponding velocity factor representing a change in volume of online searches for physical items having the particular physical attribute in a specified time period relative to the volume of online searches in a prior time period, wherein each corresponding velocity factor indicates (i) a direction and (ii) a magnitude of change over time of user interest in the particular physical attribute of the physical item;
  generating, for each different combination of physical attributes among multiple different combinations of physical attributes of the physical item, a velocity vector from a collection of the corresponding velocity factors of the physical attributes included in the different combination of physical attributes;
  generating a mapping of the velocity vectors to the different combinations of physical attributes;
  predicting, based on the mapping of the velocity vectors to the different combinations of physical attributes of the physical item, that the velocity factor of the physical item will increase in response to a change to one or more physical attributes of the physical item; and
  transmitting, to a source of the particular item, an electronic message suggesting modifying the physical item to have the combination of physical attributes mapped to velocity vector that led to the prediction that the increase to the velocity factor of the physical item.

8. The system of claim 7, wherein generating a mapping comprises creating a machine learning model that applies reinforcement learning.

9. The system of claim 7, wherein transmitting an electronic message comprises transmitting instructions that, when executed by the source of the particular item, cause a change to the one or more physical attributes of the particular item.

10. The system of claim 7, wherein generating a mapping comprises analyzing a negative cost function.

11. The system of claim 7, wherein detecting a set of physical attributes items comprises performing image recognition.

12. The system of claim 7, wherein obtaining a corresponding velocity factor includes determination of a cyclical or periodic change in acquisitions over at least one of time or physical attributes.

13. A computer-readable storage device storing instructions that when executed by one or more processors cause the one or more processors to perform operations comprising:
  detecting a set of physical attributes of a physical items;
  obtaining, for each particular physical attribute among the set of physical attributes of the physical item, a corresponding velocity factor representing a change in volume of online searches for physical items having the particular physical attribute in a specified time period relative to the volume of online searches in a prior time period, wherein each corresponding velocity factor indicates (i) a direction and (ii) a magnitude of change over time of user interest in the particular physical attribute of the physical item;
  generating, for each different combination of physical attributes among multiple different combinations of physical attributes of the physical item, a velocity vector from a collection of the corresponding velocity factors of the physical attributes included in the different combination of physical attributes;
  generating a mapping of the velocity vectors to the different combinations of physical attributes;
  predicting, based on the mapping of the velocity vectors to the different combinations of physical attributes of the physical item, that the velocity factor of the physical item will increase in response to a change to one or more physical attributes of the physical item; and
  transmitting, to a source of the particular item, an electronic message suggesting modifying the physical item to have the combination of physical attributes mapped to velocity vector that led to the prediction that the increase to the velocity factor of the physical item.

14. The computer-readable storage device of claim 13, wherein generating a mapping comprises creating a machine learning model that applies reinforcement learning.

15. The computer-readable storage device of claim 13, wherein obtaining a velocity factor includes determination of a cyclical or periodic change in acquisitions over at least one of time or physical attributes.

\* \* \* \* \*

UNITED STATES PATENT AND TRADEMARK OFFICE
CERTIFICATE OF CORRECTION

| | |
|---|---|
| PATENT NO. | : 11,295,154 B2 |
| APPLICATION NO. | : 16/267116 |
| DATED | : April 5, 2022 |
| INVENTOR(S) | : Daniel Greenwald et al. |

It is certified that error appears in the above-identified patent and that said Letters Patent is hereby corrected as shown below:

In the Claims

Column 25, Line 20, Claim 7, delete "items;" and insert -- item; --

Column 26, Line 18, Claim 13, delete "items;" and insert -- item; --

Signed and Sealed this
Twelfth Day of July, 2022

*Katherine Kelly Vidal*

Katherine Kelly Vidal
*Director of the United States Patent and Trademark Office*